April 28, 1936.   P. WARD   2,038,693
COMBINATION TOOL
Filed Nov. 6, 1935
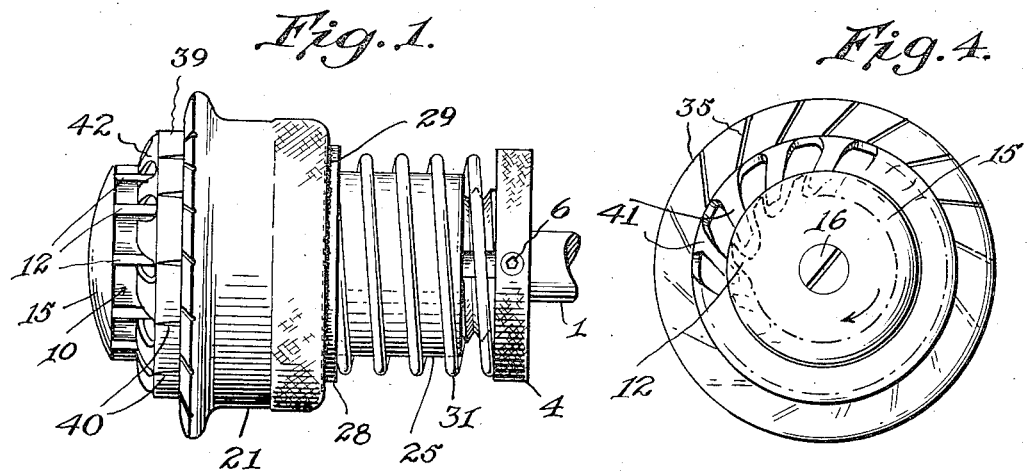
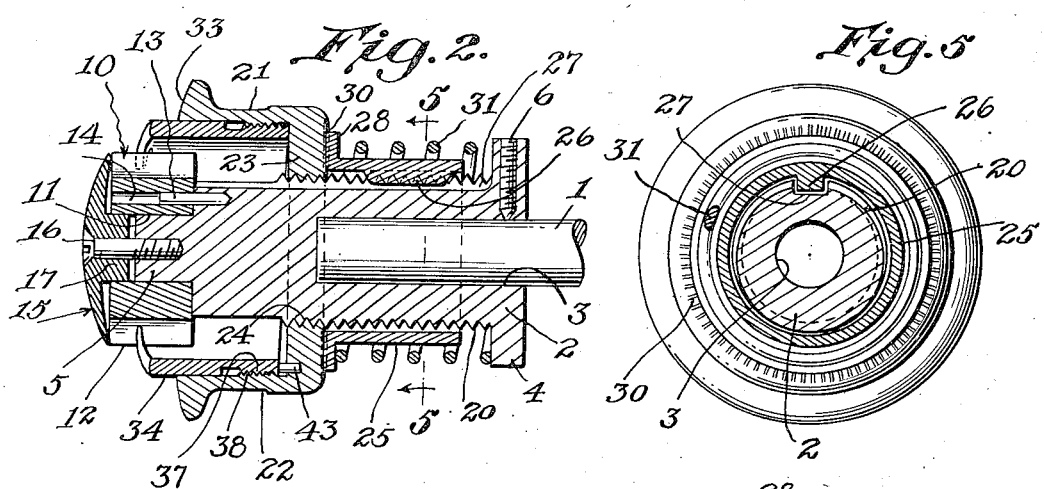
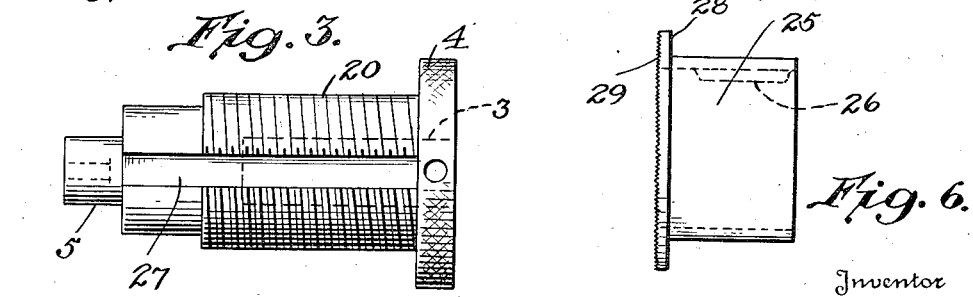
Inventor
Paul Ward
By Eugene R. Ward
Attorney Patented Apr. 28, 1936

2,038,693

UNITED STATES PATENT OFFICE 2,038,693

COMBINATION TOOL

Paul Ward, Nashville, Tenn.

Application November 6, 1935, Serial No. 48,599

15 Claims. (Cl. 12—17)

This invention relates to shoe working machinery and represents an improvement in the type of combination tool for trimming and waxing the edges of shoe soles and heel lifts, described in my Patent No. 1,983,256, dated December 4, 1934.

An important object of my invention is to provide a combination tool of the above character in which the gages for the trimmer and waxer are operatively connected in such manner that adjustment of one of the gages causes positive adjustment of the other gage. More particularly this object is attained by threadedly connecting the pair of gages so that rotation of one gage to effect its setting produces longitudinal displacement of the other gage to automatically set the latter.

In its preferred form the invention contemplates the provision of a waxer gage surrounding the waxing cylinder and threadedly mounted upon a fixed portion of the tool head, and a trimmer gage surrounding the rotary trimmer threadedly connected to the waxer gage whereby rotation of the waxer gage to displace the latter longitudinally of the head in one direction effects lengthwise displacement of the trimmer gage in the other direction. By forming the trimmer gage as a unitary part of the waxing cylinder and by mounting the waxing cylinder in telescopic relation to the waxer gage, suitable means being provided for retaining the latter against rotation upon the tool head, rotation of the waxer gage in either direction causes longitudinal travel of the trimmer gage to cover or uncover portions of the trimmer.

An important feature of the invention is the correlation between the screw threads connecting the waxer gage to the tool head and the screw threads connecting the waxing cylinder to the waxer gage, these threads extending in the same direction and bearing a pitch ratio of 2:1, respectively. Thus, a single revolution of the waxer gage results in its longitudinal displacement upon the tool head a distance equal to twice the displacement of the waxing cylinder, so that the trimmer gage, defined by the outer end of the waxing cylinder, always occupies a medial position between the outer end of the trimmer and the work-engaging face of the waxer gage. By virtue of this relationship the same margin of work presented to the trimmer is allowed to be presented to the waxer in a subsequent finishing step.

Another object of my invention is to provide a combination tool of the above character in which the outer end of the waxing cylinder is so constructed and arranged as to function as a fringe cutter to remove the fins produced by the action of the trimmer upon the soft leather or similar stock. This object is accomplished in the preferred form of my invention by providing inturned sharpened fingers or blades upon the outer end of the waxing cylinder which project between the cutting blades of the trimmer and rotate with the latter during the trimming operation.

Other objects and advantages of the invention will be apparent from the following detailed description of one preferred embodiment thereof, reference being had to the annexed sheet of drawings, in which:

Figure 1 is a side view of a combination trimming, fringe cutting and waxing tool embodying the features of the invention;

Figure 2 is a longitudinal cross-sectional view of the tool of Figure 1;

Figure 3 is a side view of the tool head;

Figure 4 is an end view of the tool of Fig. 1;

Figure 5 is a transverse sectional view of the tool on the line 5—5 of Figure 2; and Figure 6 is a side view of the sleeve which surrounds a portion of the tool head of Figure 3.

The combination tool illustrated in the drawing is adapted to be mounted upon one end of a horizontal shaft 1, which is capable of rotation at suitable cutting speed by driving mechanism, not shown. Mounted upon this shaft is a generally cylindrical tool head 2 having an axial socket 3 snugly fitting over an end of the shaft 1. This tool head is provided at its inner end with a circumferential flange 4 and at its outer end with a reduced extension 5. A set screw 6 threadedly mounted within a radial opening extending from the circumference of the flange 4 into the socket 3 affords a convenient means for detachably fastening the tool head upon the shaft 1 so as to rotate with this shaft.

Seated upon the reduced extension 5 of the head is a transverse rotary trimmer 10 having a central bore 11 adapted to slip onto the reduced extension. The trimmer is provided with a series of circumferentially-spaced cutting blades 12, as most clearly indicated by dotted lines in Figure 4 of the drawing, these blades extending generally lengthwise of the axis of the trimmer and being slightly inclined out of radial planes in the direction of their normal rotation. The length of the trimmer is such as to overhang the end of the reduced extension 5, and for holding the trimmer against rotation a pin 13 projecting from the outer end of tool head 2 is received within a complementary recess 14 formed in the trimmer.

Endwise displacement of the trimmer is prevented by a convex guard cap 15 overlying the outer face of the trimmer and retained in position by a screw 16 extending centrally through the cap 15 into the end of reduced extension 5. The cap 15 is formed with an axial boss 17 which snugly fits into the central bore 11 of the trimmer but terminates short of the end of the reduced extension. Thus by withdrawing the screw 16 and removing the cap 15 the trimmer may be slid off of the end of the reduced extension.

As best shown in Figure 3, the tool head 2 is provided with screw threads 20 extending from the flange 4 for a substantial distance lengthwise of the head. These screw threads are raised above the circumference of the head, and designed to travel along the threads is a cylindrical cup 21 terminating at its inner end in an inwardly directed flange 23 which is centrally formed with a screw threaded opening 24 which cooperates with the threads 20 upon the tool head. The cup may be rotated to move it backwards and forwards along the tool head, as will be later explained.

In order to maintain the cup in its positions of adjustment, there is provided a cylindrical sleeve 25 which loosely encircles the tool head and which is provided upon its interior with a key 26 slidably received within a slot 27 extending lengthwise of the head. This sleeve, as more clearly shown in Figure 6, has at its forward end a flat circumferential flange 28 provided with shallow V-shaped serrations 29 upon its outwardly disposed face designed to cooperate with companion serrations 30 upon the opposed external face of flange 23. A coil spring 31 surrounds the sleeve 25 and bears at one end against the flange 28 of the sleeve and at its other end against the flange 4 of the head 2. The coil spring is maintained under sufficient compression to bias the sleeve 25 toward the cup 21 and interlock the serrations 29 with the serrations 30 but yields to allow these serrations to slide over each other in manual adjustment of the cup along the head.

The outer end of cup 21 presents a rounded edge 33 which constitutes a gage for the waxing or burnishing cylinder 34, and is provided with inclined shallow channels 35 (Fig. 4) for retaining small deposits of wax, or similar coating material, during the waxing or burnishing operation.

The waxing cylinder, or waxer, 34 fits telescopically within the cup 21 and at its inner end is provided with screw threads 37 cooperating with companion threads 38 formed upon the inner circumference of the cup. The waxing cylinder projects outwardly beyond the gage 33 so as to provide a friction surface having circumferentially spaced indentations 40 (Figure 1) for retaining wax. The outer end of the waxing cylinder is formed with a series of flattened inturned fingers 41, as indicated in Figure 4, which project into the spaces between the blades of the trimmer 10, and prevent rotation of the waxing cylinder relative thereto. The fingers together define a transverse, slightly rounded shoulder or abutment 42 which serves as a gage for limiting the extent of the work that may be presented to the trimmer.

This group of fingers 41 also functions as a fringe cutter for removing the fins of leather produced upon the edge of the work by the severing action of the trimmer 10. In order to perform this latter object the slots separating the fingers are disposed at an inclination corresponding generally to the inclination of the blades of the trimmer, as indicated in Fig. 4, and the edges of the fingers are sharpened upon their leading edges in the normal rotation of the tool head. These fingers thus act as cutting blades and their inclination is such as remove the fins which project into the spaces between the fingers with a draw or slicing cut.

The waxer gage 33 and the trimmer gage 42 are simultaneously and uniformly adjustable relative to the instrumentalities with which they cooperate so that the sequential operations of trimming and waxing (or burnishing) may be performed upon foot-wear without the necessity of making independent settings of these gages, it being understood that better practice in the shoe working art requires that substantially the same area of the work operated upon by the trimmer shall be subsequently presented to the waxer. In order to achieve this object the threads 20 upon the circumference of the tool head and the threads 37 upon the inner end of waxing cylinder 34 both wind in the same direction and bear a pitch relationship of 2:1, respectively. That is, the distance between the threads 20, which may be termed P, is twice the distance between threads 37, which may be termed p. Thus in setting the gages, when the cup 21 is manually rotated clockwise through a single revolution, as viewed in Figure 4, the cup will be disposed inwardly along the tool head 2 a distance P, but, since the waxing cylinder 34 is maintained stationary relative to the tool head by the fingers 41 which engage between the trimmer blades, such rotation by virtue of the threads 37 causes simultaneous outward movement of the waxing cylinder a distance p. Thus, while retractive movement of the cup is equal to P, the waxing cylinder is projected forwardly a distance p (which is one-half of P by virtue of the selected thread ratio) so that the net displacement of the gage 33 relative to the waxing cylinder and the trimmer gage 42 relative to the trimmer are both equal to p.

The same principle holds true when the cup is rotated in the opposite direction along the head 2 to reduce the setting of the gages. That is, by rotating the cup in a counter-clockwise direction (Figure 4) it is moved forwardly equal to the distance P, while the waxing cylinder is drawn into the cup a distance p, so that it will be seen that the displacement of the gages in one complete rotation of the cup 21 in either direction is always equal to the distance P minus p. A pin 43 in the bottom of cup 21 serves as an abutment for the end of waxing cylinder 34 to prevent it from binding against the bottom of the cup when fully retracted.

The cup 21 may be externally knurled, as shown in Figure 1, to provide a better finger hold to facilitate rotating the same.

From the above description it will be apparent that the combination tool rotates with the shaft 1 and the shoe is presented to the trimmer 10 by pressing the edge of the sole or heel flatly against the gage 42. During the trimming operation the fringes formed upon the edge of the work by the rapidly rotating trimmer will project onto the spaces separating the fingers 41 of the fringe cutter 42 and will be cleanly cut away by the rapidly rotating fingers. The trimmed edges of the work are then polished by pressing them against the revolving waxing cylinder 34. Thus the work is cleanly trimmed and waxed and presents no ragged edges which must be pared away in a finishing step.

It will be manifest that various changes in structure and design in the preferred embodiment of the invention described above may be made without departing from the spirit of my invention.

I claim:

1. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, and means for adjusting the waxing cylinder lengthwise of the trimmer.

2. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, and rotatable means threadedly mounted upon the head for moving the waxing cylinder lengthwise of the trimmer.

3. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, and rotatable means threadedly connected to the waxing cylinder for moving the latter relative to the trimmer.

4. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, and rotatable means threadedly connected to the head and to the waxing cylinder for moving the latter relative to the trimmer.

5. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a gage associated with said waxing cylinder, and common operating means for causing simultaneous displacement of the gages relative to the trimmer and waxer.

6. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a gage associated with said waxing cylinder, and common operating means for displacing the trimmer gage simultaneously with the waxer gage.

7. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a gage associated with said waxing cylinder and screw threaded means for causing simultaneous displacement of the gages relative to the trimmer and waxer.

8. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a waxer gage rotatably mounted upon the head and threadedly associated with said waxing cylinder, and means for maintaining the waxing cylinder against rotation relative to the head whereby rotation of said waxer gage upon the head causes endwise displacement of said waxing cylinder.

9. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a waxer gage threadedly mounted upon the head and having said waxing cylinder threadedly associated therewith, and means for maintaining said waxer gage against rotation whereby rotation of said waxer gage causes equal endwise displacements of the gages relative to the trimmer and waxing cylinder respectively.

10. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer, the end of said waxing cylinder serving as a gage for the trimmer, a waxer gage being threadedly mounted upon the head and threadedly associated with the waxing cylinder, and means for maintaining said waxing cylinder against rotation relative to the trimmer, the two sets of threads being so directed and of such a pitch relationship as to cause longitudinal travel of the waxer gage in one direction relative to the head equal to twice the longitudinal travel of the trimmer gage in the opposite direction relative to the waxing cylinder.

11. A combination tool comprising a head adapted to be mounted upon a rotatable drive shaft, a rotary trimmer and a rotary waxer located at spaced intervals along said head, said trimmer comprising a series of cutting blades circumferentially spaced about the head and said waxer comprising a waxing cylinder located adjacent said trimmer and comprising a cup threadedly mounted upon the head, the end of said waxing cylinder serving as a gage for the trimmer, and said cylinder being threadedly connected to the interior of said cup, the threads of the head and the threads of the waxing cylinder being disposed in the same direction and having a pitch ratio of 2:1, and means for maintaining said waxing cylinder against rotation relative to the trimmer whereby rotation of the waxer gage causes longitudinal displacement of the gages in opposite directions relative to the head and to the waxing cylinder respectively.

12. A combination tool comprising a head adapted to be mounted upon a rotatable drive shaft, a rotary trimmer and a rotary waxer located at spaced intervals along said head, said trimmer comprising a series of circumferentially-spaced cutting blades, and said waxer comprising a waxing cylinder surrounding and having an end serving as a gage for the trimmer, a waxer gage threadedly mounted upon the head and threadedly connected to the waxing cylinder, and means for maintaining the waxing cylinder against rotation relative to the head, the sets of threads connecting the waxer gage to the head and to the waxing cylinder being similarly directed and bearing a pitch ratio of 2:1 respectively whereby rotation of the waxer gage causes unequal longitudinal displacements of the gages relative to the head.

13. A combination tool comprising a head adapted to be mounted upon a rotatable drive shaft, a rotary trimmer and a rotary waxer located at spaced intervals along said head, said trimmer comprising a series of circumferentially-spaced cutting blades, and said waxer comprising a waxing cylinder surrounding and having an end serving as a gage for the trimmer, a waxer gage threadedly mounted upon the head and threadedly connected to the waxing cylinder, means for maintaining the waxing cylinder against rotation relative to the head, the sets of threads connecting the waxer gage to the head and to the waxing cylinder being similarly directed and bearing a pitch ratio of 2:1 respectively whereby rotation of the waxer gage causes unequal displacements of the gages relative to the head, and means for impositively retaining the waxer gage against rotation.

14. A combination tool comprising a head adapted to be mounted upon a rotatable drive shaft, a rotary trimmer and a rotary waxer located at spaced intervals along said head, said trimmer comprising a series of circumferentially-spaced cutting blades, and said waxer comprising a waxing cylinder surrounding and having an end serving as a gage for the trimmer, a waxer gage threadedly mounted upon the head and threadedly connected to the waxing cylinder, means for maintaining the waxing cylinder against rotation relative to the head, the sets of threads connecting the waxer gage to the head and to the waxing cylinder being similarly directed and bearing a pitch ratio of 2:1 respectively whereby rotation of the waxer gage causes unequal displacements of the gages relative to the head, and a sleeve surrounding said head and bearing resiliently against said waxer gage to impositively retain it against rotation.

15. A combination tool comprising a head adapted to be mounted upon a rotatable drive shaft, a rotary trimmer and a rotary waxer located at spaced intervals along said head, said trimmer comprising a series of circumferentially-spaced cutting blades, and said waxer comprising a waxing cylinder surrounding and having an end serving as a gage for the trimmer, a waxer gage threadedly mounted upon the head and threadedly connected to the waxing cylinder, means for maintaining the waxing cylinder against rotation relative to the head, the sets of threads connecting the waxer gage to the head and to the waxing cylinder being similarly directed and bearing a pitch ratio of 2:1 respectively whereby rotation of the waxer gage causes unequal displacements of the gages relative to the head, a sleeve surrounding said head and disposed adjacent said waxer gage, serrations upon the opposed faces of said waxer gage and sleeve, and a spring biasing the serrated faces of the waxer gage and sleeve into interlocking engagement.

PAUL WARD.